United States Patent [19]

Bottacco

[11] Patent Number: 5,531,362

[45] Date of Patent: Jul. 2, 1996

[54] AUTOMATIC APPARATUS FOR METERING SPAGHETTI AND THE LIKE

[75] Inventor: Carlo M. G. Bottacco, Montecarlo, Monaco

[73] Assignee: Forbrose B.V., Amsterdam, Netherlands

[21] Appl. No.: 414,122

[22] Filed: Mar. 20, 1995

[30] Foreign Application Priority Data

Mar. 21, 1994 [IT] Italy .................................. MI94A0542

[51] Int. Cl.⁶ ..................................................... G01F 11/00
[52] U.S. Cl. .......................... 222/390; 222/405; 222/504; 99/407
[58] Field of Search ............................. 222/333, 63, 390, 222/388, 405, 409, 504, 444, 357; 99/407

[56] References Cited

U.S. PATENT DOCUMENTS 2,359,367  10/1944  Kerr-Lawson ............................ 222/405
4,359,935  11/1982  Murray ........................................ 99/407
4,501,382   2/1985  van Twuyver ............................ 222/405

FOREIGN PATENT DOCUMENTS 739545    9/1943  Germany ................................ 222/405
1964396   7/1971  Germany ................................ 222/405

Primary Examiner—Andres Kashnikow
Assistant Examiner—Philippe Derahshani
Attorney, Agent, or Firm—Bucknam and Archer

[57] ABSTRACT

An automatic apparatus for metering spaghetti and the like including a spaghetti vessel having a bottom which can be displaced by a controlled driving device, the vessel being provided with an overflow rim adjoining a collecting bin, having a pouring outlet controlled by a shutter element.

6 Claims, 3 Drawing Sheets

AUTOMATIC APPARATUS FOR METERING SPAGHETTI AND THE LIKE

BACKGROUND OF THE INVENTION

The present invention relates to an automatic apparatus for dosing or metering spaghetti and the like.

As is known, in restaurants, hotels, communities and the like, it is necessary to precisely and quickly meter the alimentary pasta amount being cooked, so as to provide even rated consumption amount and prevent waste due to an excessive metering.

At present this problem is solved by the skill of the cook or chef who must properly manually meter the spaghetti amount to be cooked.

However, such a procedure is not reliable and, moreover the single doses can not be weighed, since such an operation, while being very simple, would require a comparatively long time and could not be easily performed in a kitchen.

SUMMARY OF THE INVENTION

Accordingly, the general object of the present invention is to overcome the above mentioned drawbacks, by providing an automatic spaghetti metering apparatus, which is specifically designed to simply and quickly metering spaghetti in a fully automatic manner.

within the scope of the above mentioned general object, a main object of the present invention is to provide such an automatic spaghetti metering apparatus which can be easily joined with existing spaghetti cooking apparatus, thereby allowing the spaghetti to be cooked to be immediately sent from the metering vessel therefor to the cooking apparatus.

Yet another object of the present invention is to provide such an automatic spaghetti metering apparatus which prevents any contact of the spaghetti by a cook or chef, and which, moreover, is very reliable in operation and very competitive from a mere economic standpoint.

According to one aspect of the present invention, the above mentioned objects, as well as other objects, which will become more apparent hereinafter, are achieved by an automatic spaghetti metering apparatus, characterized in that said apparatus comprises a vessel for spaghetti to be metered, said vessel having a vessel bottom which can be displaced by controlled driving means, said vessel being provided with an overflow rim adjoining a collecting bin having a pouring outlet controlled by shutter means.

BRIEF DESCRIPTION OF THE DRAWINGS

Further characteristics and advantages of the invention will become more apparent hereinafter from the following detailed disclosure of a preferred, though not exclusive, embodiment of an automatic spaghetti metering apparatus, which is illustrated, by way of an indicative, but not limitative, example, in the accompanying drawings, in which.

DESCRIPTION OF THE PREFERRED EMBODIMENT

Figure 1:
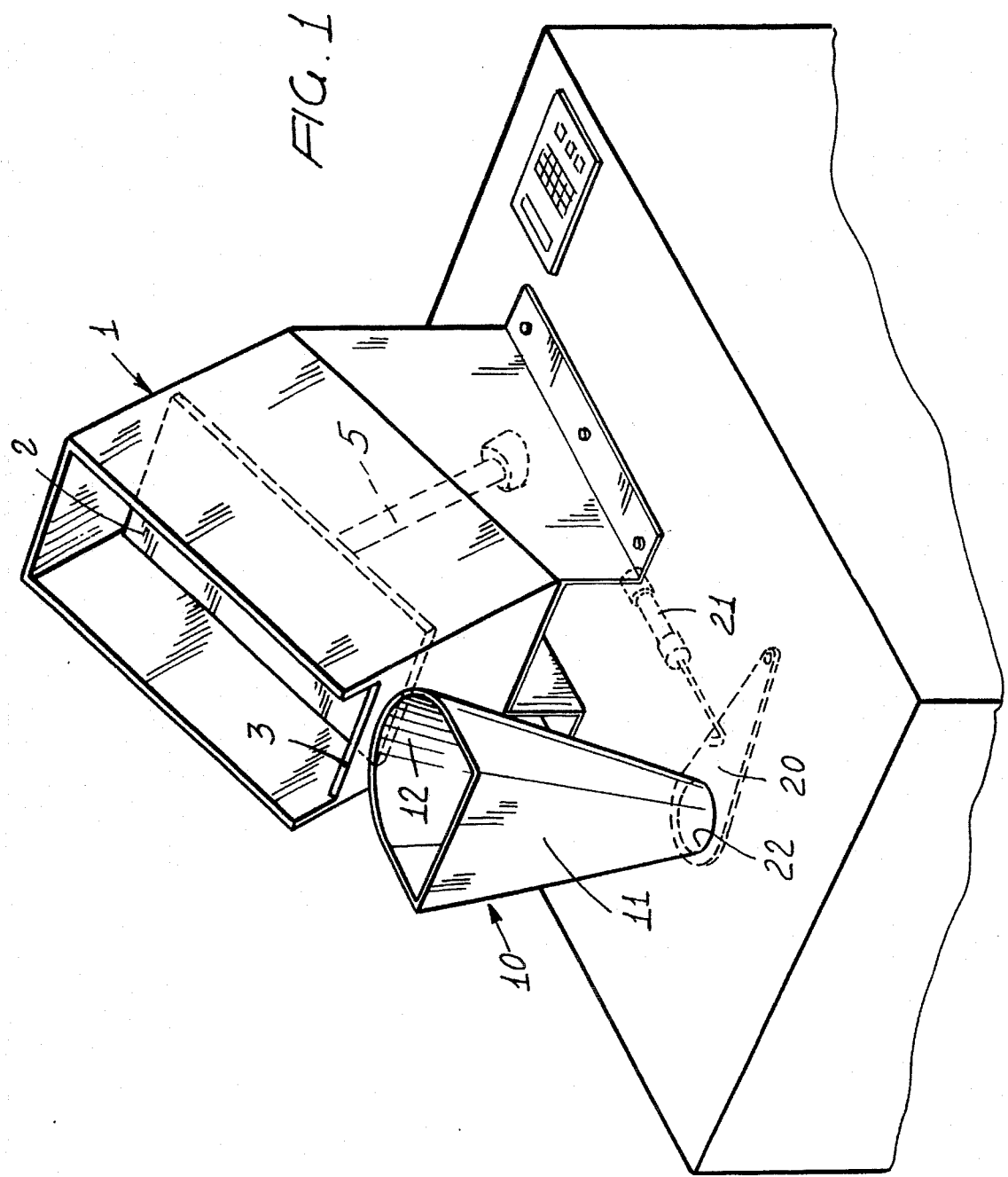
FIG. 1 is a schematic perspective view of the automatic spaghetti metering apparatus according to the present invention.
Figure 2:
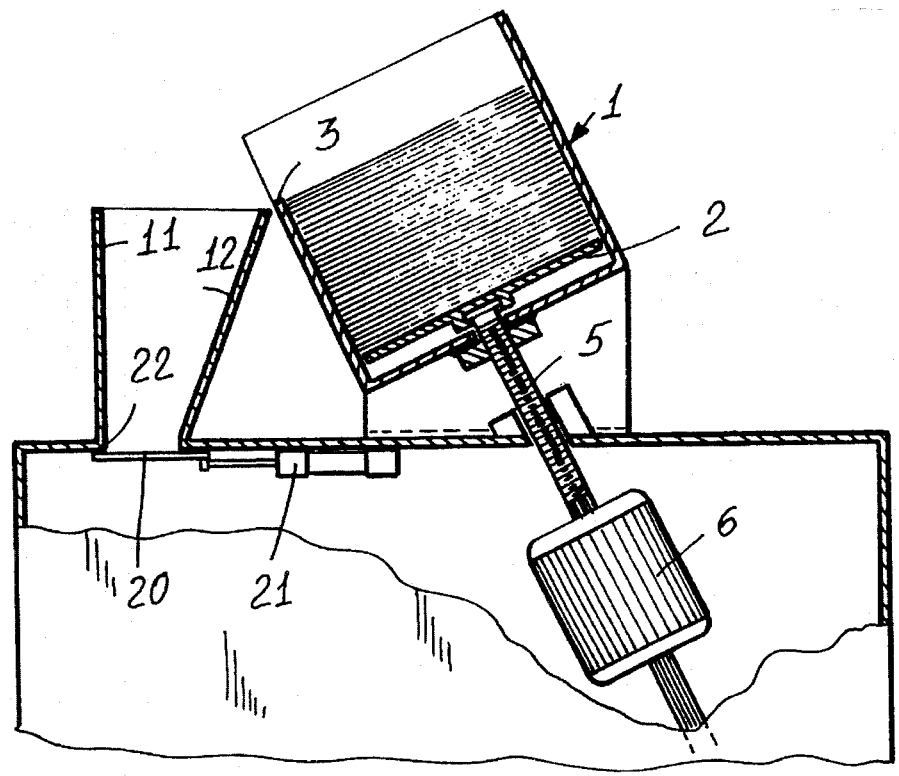
FIG. 2 is a cross-sectional view illustrating a spaghetti vessel, with spaghetti set for the metering thereof.
Figure 3:
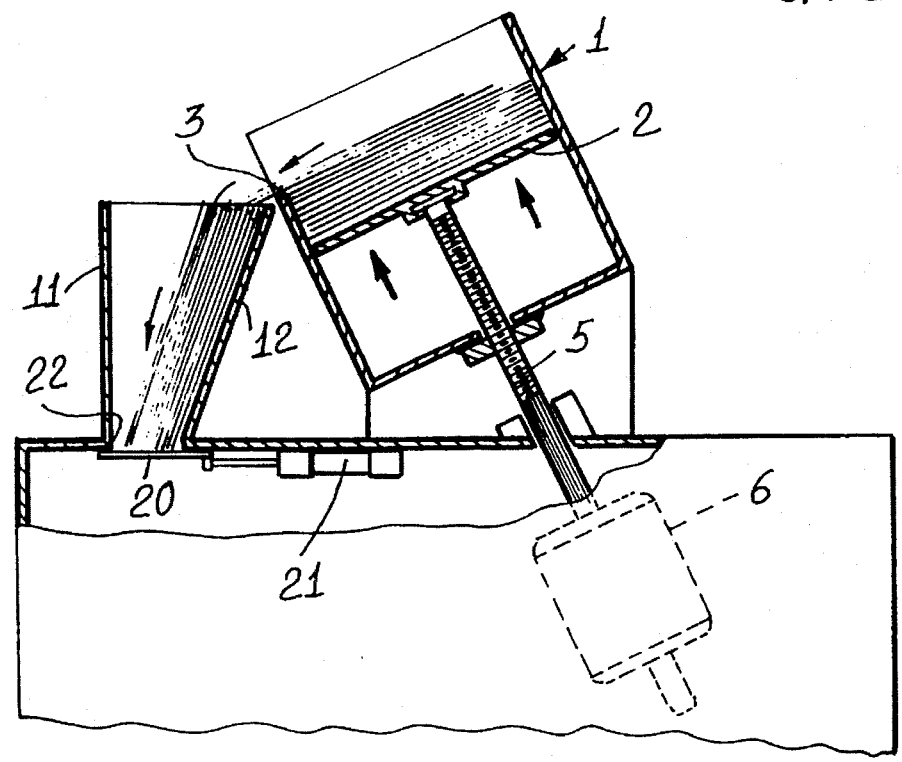
FIG. 3 illustrates the spaghetti metering step.
Figure 4:
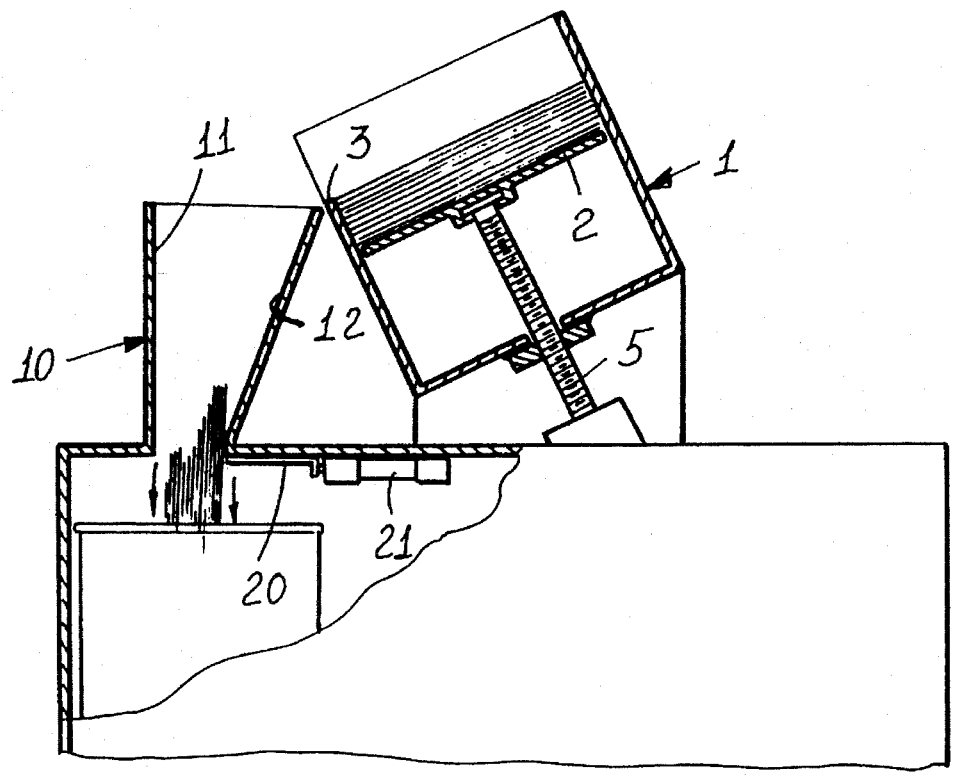
FIG. 4 is a cross-sectional view illustrating an operating step in which spaghetti are introduced into a cooking chamber or apparatus.
Figure 5:
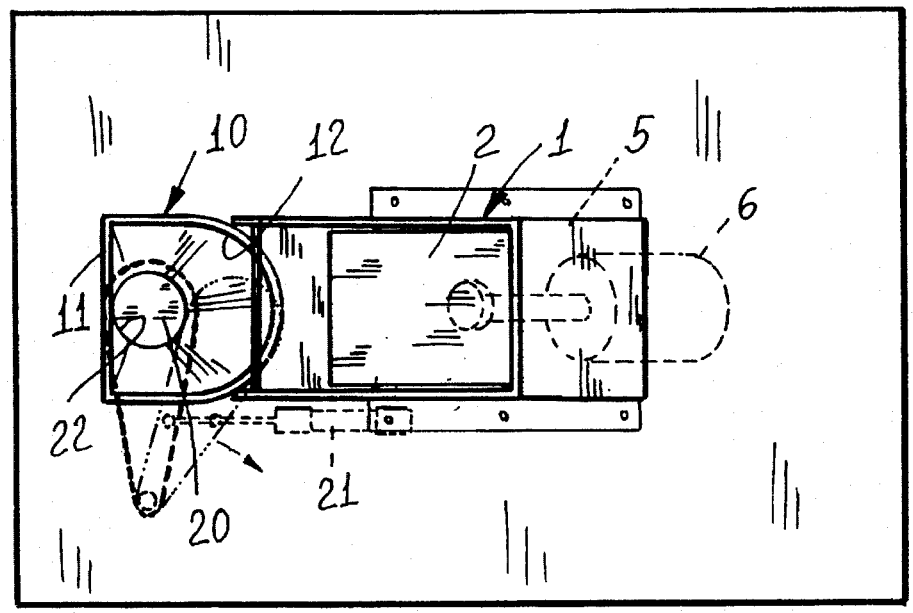
FIG. 5 is a top plan view illustrating the automatic spaghetti metering apparatus according to the invention.

With reference to the number reference of the above mentioned figures, the automatic spaghetti metering apparatus according to the present invention comprises a spaghetti vessel, generally indicated by the reference number 1, which has advantageously a rectangular shape and is provided with a bottom 2, slanted toward an overflow rim or edge 3, from which spaghetti are poured, as it will become more apparent hereinafter.

The bottom 2 can be displaced, by controlled driving means which, according to a preferred, though not exclusive, embodiment, can comprise a threaded rod 5, driven by a motor 6, in turn controlled by electronic means adapted to set a rotary angle corresponding to a set amount of displacement of the bottom 2.

The overflow rim 3 is arranged near a bin, generally indicated by the reference number 10, having a bin wall 11, opposite to the overflow rim 3, and a curved wall 12, opposite to said wall 11 and arranged under the overflow rim 3.

In operation, spaghetti exceeding the overflow rim 3, under the raising force of the bottom 2, will slide in a longitudinal direction so as to impact against the flat wall 11, and they will be vertically arranged to abut against the curved wall 12 which is advantageously slanted at about 30° with respect to the vertical direction.

As shown, the bin 10 is closed, at the bottom thereof, by shutter means 20, driven by a driving piston 21 which, as the present dose is achieved, will cause the shutter means 20 to turn, so as to disengage the spaghetti bin pouring outlet 22, so as to cause the metered spaghetti to be immediately introduced into the cooking chamber or apparatus.

With the disclosed arrangement, the cook or chef may simply set, by an electronic controlling unit or other means, the number of doses of spaghetti to be metered, and the motor 6 will provide such a rotary movement to properly displace the bottom 2 by an amount corresponding to the provided doses.

Spaghetti will be automatically introduced into the bin 10 and from the latter into the cooking chamber, in a fully automatic manner.

With the disclosed arrangement, it is possible to provided a very quick and accurate metering of the spaghetti to be cooked; moreover, the cook or chef does not contact the spaghetti to be cooked, thereby providing very good hygienic conditions.

The vessel 1 can have a very large size, thereby it can contain a very large amount of spaghetti, with a consequent very long operation time without requiring any additions of new spaghetti.

The invention, as disclosed, is susceptible to several variations and modifications, all of which will come within the scope of the inventive idea.

Moreover, all of the details can be replaced by other technically equivalent elements.

In practicing the invention, the used materials, provided that they are compatible to the intended use, as well as the contingent size and shapes, can be any, depending on requirements.

I claim:

1. An automatic spaghetti metering apparatus, said apparatus comprising:
   a) a vessel for spaghetti to be metered;
   b) a bottom in said vessel which is adapted to be displaced;
   c) controlled driving means for displacing said vessel bottom;
   d) an overflow rim provided on said vessel;
   e) a collecting bin adjoining said overflow rim having a flat wall opposite said overflow rim and a curved wall facing said overflow rim; and
   f) a pouring outlet in said collecting bin controlled by shutter means.

2. An automatic apparatus, according to claim 1, wherein said vessel comprises side walls, said side walls and said bottom are slanted toward said bin.

3. An automatic apparatus, according to claim 1, wherein said controlled driving means comprise a threaded rod which is driven by a motor.

4. An automatic apparatus according to claim 3, wherein said apparatus further comprises electronic means for controlling said motor.

5. An automatic apparatus, according to claim 1, wherein said curved wall is slanted substantially at 30° with respect to a vertical direction.

6. An automatic spaghetti metering apparatus, said apparatus comprising:
   a) a vessel for spaghetti to be metered;
   b) a bottom in said vessel which is adapted to be displaced;
   c) controlled driving means for displacing said vessel bottom;
   d) an overflow rim provided on said vessel;
   e) a collecting bin adjoining said overflow rim;
   f) a pouring outlet in said collecting bin controlled by shutter means; and
   g) piston means arranged for driving said shutter means.

* * * * *